(12) United States Patent
Mitchell

(10) Patent No.: US 8,684,871 B2
(45) Date of Patent: Apr. 1, 2014

(54) BELT POSITIONER

(75) Inventor: David Mitchell, Carina Heights (AU)

(73) Assignee: Private Brand Tools (Australia) Pty. Ltd., Queensland (AU)

( * ) Notice: Subject to any disclaimer, the term of this patent is extended or adjusted under 35 U.S.C. 154(b) by 223 days.

(21) Appl. No.: 12/854,579

(22) Filed: Aug. 11, 2010

(65) Prior Publication Data

US 2012/0040791 A1 Feb. 16, 2012

(51) Int. Cl.
*F16H 7/22* (2006.01)

(52) U.S. Cl.
USPC .......................................................... 474/130

(58) Field of Classification Search
USPC .................. 474/129, 130, 131, 132; 254/250; 29/809
See application file for complete search history.

(56) References Cited

U.S. PATENT DOCUMENTS

| | | | |
|---|---|---|---|
| 2,499,173 A * | 2/1950 | Taylor | 474/130 |
| 2,924,109 A * | 2/1960 | Carriveau | 474/130 |
| 4,325,703 A * | 4/1982 | Phillips | 474/130 |
| 6,402,649 B1 | 6/2002 | Amkreutz | |
| 6,692,391 B2 * | 2/2004 | Gerring et al. | 474/130 |
| 7,335,121 B2 * | 2/2008 | Fletcher et al. | 474/130 |
| D577,968 S | 10/2008 | Siau | |
| 2003/0211910 A1* | 11/2003 | Gerring et al. | 474/130 |
| 2005/0164815 A1* | 7/2005 | Winninger et al. | 474/130 |
| 2006/0009322 A1 | 1/2006 | Fletcher et al. | |
| 2010/0125995 A1 | 5/2010 | Fukatani | |
| 2010/0173737 A1 | 7/2010 | Coirault et al. | |

FOREIGN PATENT DOCUMENTS

| | | |
|---|---|---|
| EP | 1 089 016 | 4/2001 |
| WO | WO 02/36987 | 5/2002 |

OTHER PUBLICATIONS

Extended European Search Report issued Dec. 19, 2011 in connection with EP App No. 11176825.5.

\* cited by examiner

*Primary Examiner* — William A Rivera
(74) *Attorney, Agent, or Firm* — Nixon & Vanderhye P.C.

(57) ABSTRACT

A belt positioner 1 for installing a flexible belt into a grooved periphery 12 of a pulley 11. The positioner 1 comprises a belt guiding ramp 2, a pulley flange engaging mechanism 3, a handle 4 and a belt guiding rim 5. The belt guiding ramp 2 is extendible across the grooved periphery 12 and a belt-bearing slanting surface 20 of the ramp 2 enables the belt to be moved into engagement with the grooved periphery 12 when the pulley 11 is rotated about its rotational axis. The pulley flange engaging mechanism 3 comprises a groove 30 extending across the positioner 1 for receiving a pulley flange 13 bordering the grooved periphery 12 and a shoulder 31 bordering the groove 30 for bearing against a side face 14 of the pulley flange 13, wherein the engaging mechanism 3 locks the positioner 1 to the pulley 11 while the belt bears against the slanting surface 20. The handle 4 extends from the ramp 2 and provides a gripping surface 42 for fingers adjacent the ramp 2. In use the handle 4 extends laterally of the grooved periphery 12 and substantially parallel with the rotational axis of the pulley 11. When installing a belt, the positioner 1 need not engage a shaft of the pulley 11 nor be mounted to the pulley 11 in any additional way.

11 Claims, 7 Drawing Sheets

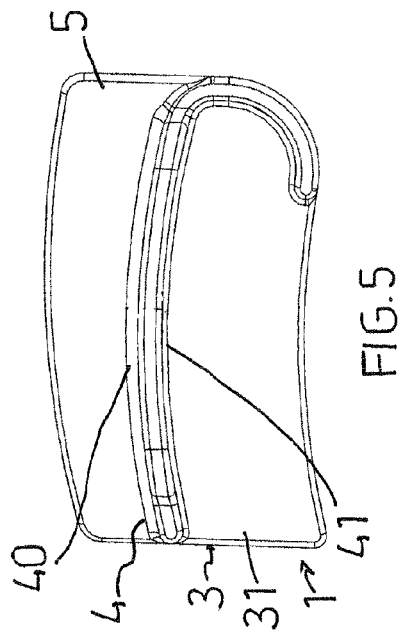
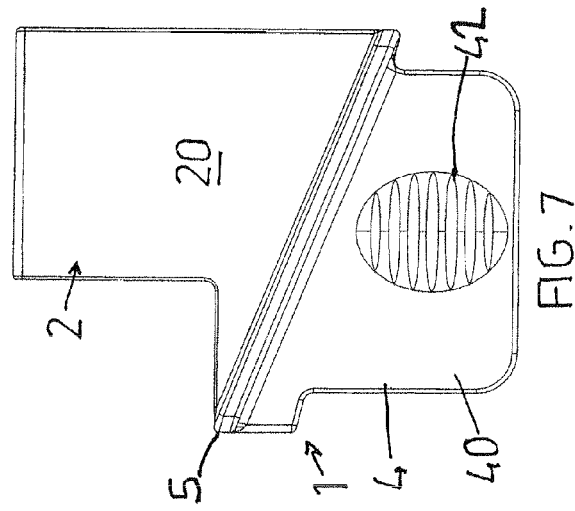
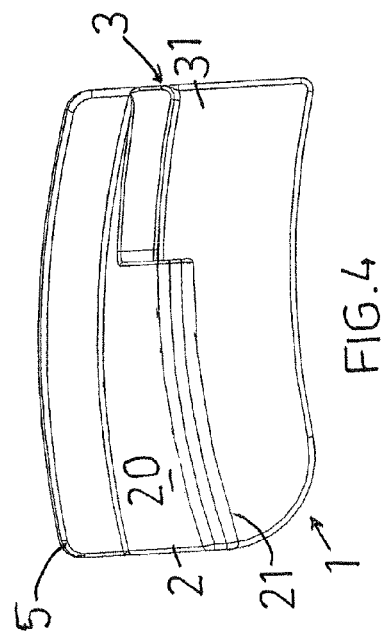
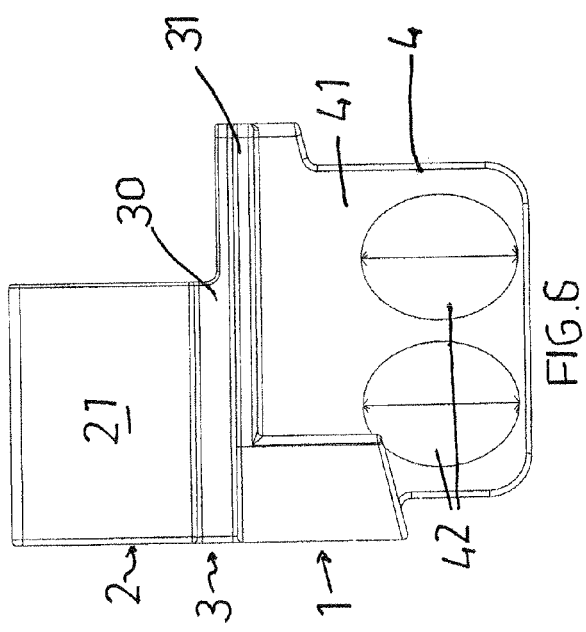

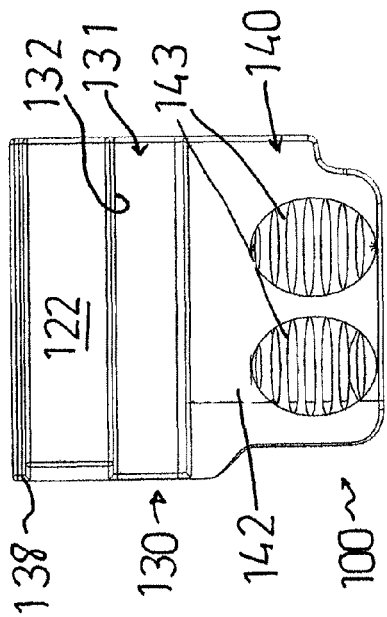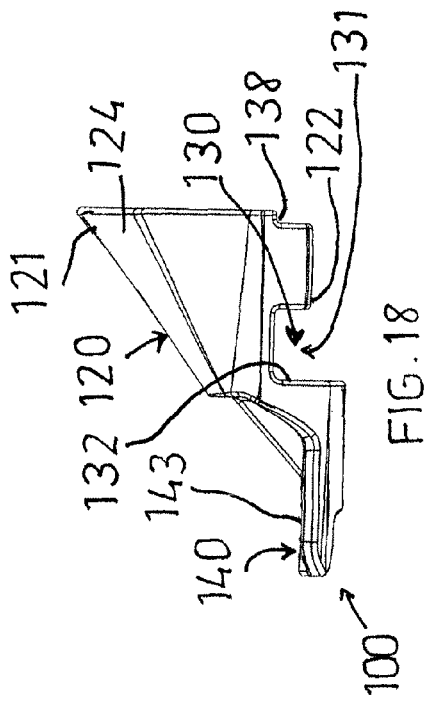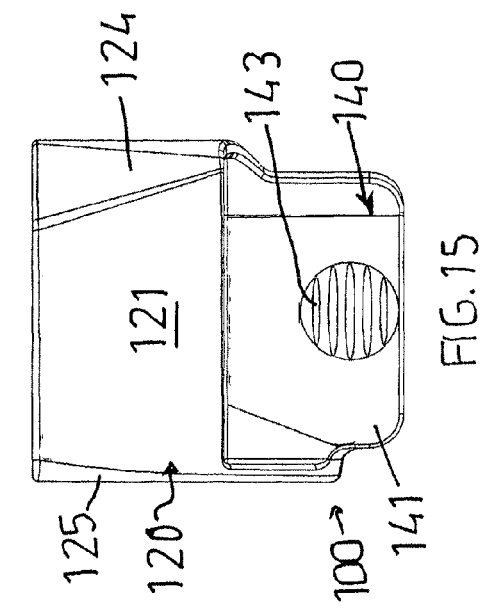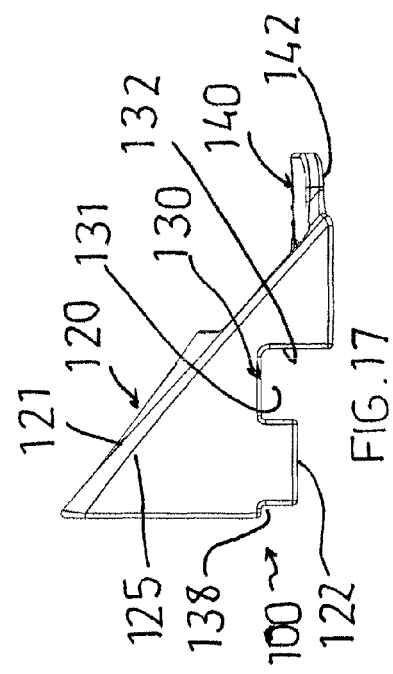

BELT POSITIONER

FIELD OF THE INVENTION

The present invention relates to a belt positioner for either installing a flexible belt into and around a grooved periphery of a pulley or for removing a flexible belt from within and around a grooved periphery of a pulley.

BACKGROUND OF THE INVENTION

Endless flexible drive belt and pulley arrangements are commonly used in motor vehicles as well as in other types of machinery. There have been many different types of flexible drive belts used on motor vehicles over time but the most common for current model vehicles is a multi-rib belt commonly referred to as a 'serpentine belt'. This type of belt is typically applied to drive pulleys of the engine and then a tensioning device is applied to maintain the correct tension to prevent belt slippage. It is recommended that the drive belts be replaced in accordance with the manufacturer's service recommendations. To carry out this service operation the tensioner device is relaxed, the old belt is removed and replaced by a new belt, and the tensioner is then reapplied. There are no special tools required to carry out this service task.

Of more recent times vehicle manufacturers have moved to a new 'stretch fit' multi-rib drive belt technology, as produced by The Gates Corporation (Denver, USA). This has removed the need for expensive tensioning devices but it has created a disadvantage when it comes time to carrying out maintenance of these belts. They are fitted at the factory using specialised installation equipment and when replacement is required in the field, the recommended service procedure is to cut the old belt from the pulleys. Then using model specific tools the new belt is wound back onto the pulleys. This creates a situation whereby a service agent must have available multiple installation tools such as part numbers SFT001, SFT002 A+B and SFT003 (to name a few) as manufactured by The Gates Corporation. These installation tools are both expensive and difficult to use as there are multiple components that require assembly and adjustment to operate.

Another disadvantage of the 'stretch fit' flexible belt is that there is no current method to allow removal and reuse of the belt. If a stretch belt has recently been replaced and then an accessory of the engine (ie. alternator, power steering pump, water pump or air conditioning compressor) fails a short time later, the newly replaced drive belt must be cut and another new belt fitted. This adds additional service cost for the customer.

Although tools have been developed for stretch 'serpentine' belt installation, they generally have a number of disadvantages. U.S. patent application Ser. No. 12/596,041 and U.S. Pat. No. 6,402,649, for example, each describe a tool for installing a flexible drive belt. A disadvantage of each of these tools, however, is that each tool must first be mounted to a shaft of the pulley by way of a positioning and retaining bolt.

SUMMARY OF THE INVENTION

The present inventor has now developed a belt positioner that overcomes one or more of the disadvantages mentioned above, or provides the public with a useful or commercial choice.

According to the present invention, there is provided a belt positioner for either installing a flexible belt into a grooved periphery of a pulley or removing a flexible belt from a grooved periphery of a pulley, said positioner comprising:

a belt guiding ramp extendible across the grooved periphery and a belt-bearing slanting surface of the ramp enables the belt to be moved either into or out of engagement with the grooved periphery when the pulley is rotated about its rotational axis;

a pulley flange engaging mechanism comprising a groove extending across the positioner for receiving a pulley flange bordering the grooved periphery and a shoulder bordering the groove for bearing against a side face of the pulley flange, wherein the engaging mechanism locks the positioner to the pulley whilst the belt bears against the slanting surface of the ramp; and a handle extending from the shoulder or ramp and providing a gripping surface for fingers adjacent the ramp, wherein in use the handle extends laterally of the grooved periphery and substantially parallel with the rotational axis of the pulley.

The handle can be of any suitable size, shape and construction provided that it can be readily gripped by fingers of a user. The handle can be made of any suitable material or materials. The handle can be, for example, in the form of an elongate member or sheet having opposed faces and providing at least one finger grip on each face of the sheet so that it can be pinched. The sheet can be arcuate when viewed on end in view of the fact that the grooved periphery is arcuate.

The size, shape and construction of the ramp will depend on whether the positioner is to install a belt or remove a belt. The ramp can be made of any suitable material or materials. In addition to the slanting surface, the ramp can have a pulley groove bearing surface and one or more side walls extending between the slanting and pulley groove bearing surfaces. The ramp can be generally wedge-shaped, although other shapes are possible. The slanting surface and pulley groove bearing surface can each be arcuate in view of the fact that the grooved periphery is arcuate.

The ramp can have a leading edge and a trailing edge, the leading edge being the edge that leads when the pulley is rotated about its rotational axis during belt installation or removal. For belt removal, the leading edge of the ramp can be rounded or tapered so it can more readily facilitate the lifting of the belt from the grooved periphery.

For belt removal, the slanting surface of the ramp can be at a greater incline than the slanting surface of the ramp when used for belt installation. For belt installation, the slanting surface of the ramp can extend across the pulley groove and further laterally thereof. For belt installation, the angle of the slanting surface of the ramp can be between about 8-16 degrees relative to the pulley groove bearing surface. For belt removal, the angle of the slanting surface of the ramp can be between about 20-30 degrees relative to the pulley groove bearing surface.

For belt installation, the positioner can further comprise a belt guiding rim extending from the slanting surface of the ramp generally across the ramp from the leading edge to the trailing edge. The belt guiding rim can be of any suitable size, shape and construction provided that it can engage a side of the belt and help guide the belt down the slanting surface into the pulley groove as the pulley is rotated. The belt guiding rim can be angled such that at the trailing edge it is closer to the pulley flange engaging mechanism groove than at the leading edge.

The groove and shoulder of the pulley flange engaging mechanism can be of any suitable size, shape and construction. The groove can extend between the leading and trailing edges of the ramp as can the shoulder. The groove can extend within the pulley groove bearing surface of the ramp. The groove can be arcuate in view of the fact that the pulley flange is arcuate.

The positioner can be of unitary construction or comprise two or more connected pieces. Preferably, the positioner is of unitary construction, being made of metal or molded plastics material.

The positioner can be used to install any suitable type of flexible belt, but such a belt would normally be a drive belt such as a 'serpentine belt' or 'stretch fit' belt for a vehicle as produced by The Gates Corporation (for example).

Preferably, the positioner is unable to engage a shaft of the pulley—unlike U.S. patent application Ser. No. 12/596,041 and U.S. Pat. No. 6,402,649.

According to a particularly preferred embodiment, there is provided a belt positioner for either installing a flexible belt into a grooved periphery of a pulley or removing a flexible belt from a grooved periphery of a pulley, said positioner comprising:

a belt guiding ramp extendible across the grooved periphery and a belt-bearing slanting surface of the ramp enables the belt to be moved either into or out of engagement with the grooved periphery when the pulley is rotated about its rotational axis;

a pulley flange engaging mechanism comprising a groove extending across the positioner for receiving a pulley flange bordering the grooved periphery and a shoulder bordering the groove for bearing against a side face of the pulley flange, wherein the engaging mechanism locks the positioner to the pulley whilst the belt bears against the slanting surface of the ramp; and a handle extending from the shoulder or ramp and providing a gripping surface for fingers adjacent the ramp, wherein in use the handle extends laterally of the grooved periphery and substantially parallel with the rotational axis of the pulley, and the positioner is unable to engage a shaft of the pulley.

Preferred embodiments of the invention will now be described by way of example with reference to the accompanying figures.

BRIEF DESCRIPTION OF THE FIGURES

FIG. 4 is a front elevation view of the belt positioner shown in FIG. 1;

FIG. 5 is a rear elevation view of the belt positioner shown in FIG. 1;

FIG. 6 is a bottom plan view of the belt positioner shown in FIG. 1;

FIG. 7 is a top plan view of the belt positioner shown in FIG. 1;

FIG. 15 is a top plan view of the belt positioner shown in FIG. 12;

FIG. 16 is a bottom plan view of the belt positioner shown in FIG. 12;

FIG. 17 is a side elevation view of the belt positioner shown in FIG. 12;

FIG. 18 is another side elevation view of the belt positioner shown in FIG. 12;

DESCRIPTION OF PREFERRED EMBODIMENTS

Figure 1:
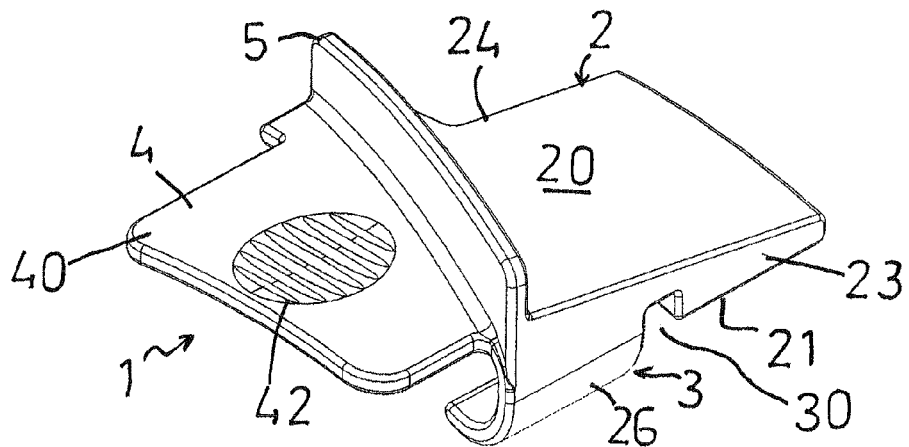
FIG. 1 is a top side perspective view of a belt positioner for installing a flexible belt such as a 'serpentine belt' or 'stretch fit' belt into a grooved periphery of a pulley, according to an embodiment of the present invention.
Figure 2:
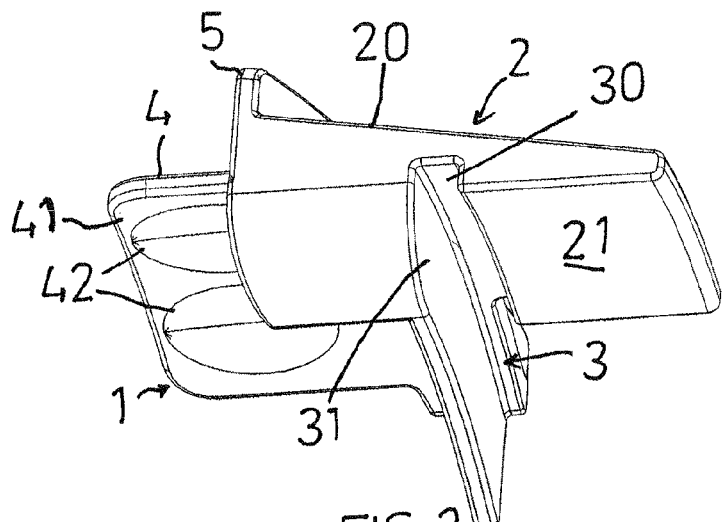
FIG. 2 is a bottom side perspective view of the belt positioner shown in FIG. 1.
Figure 3:
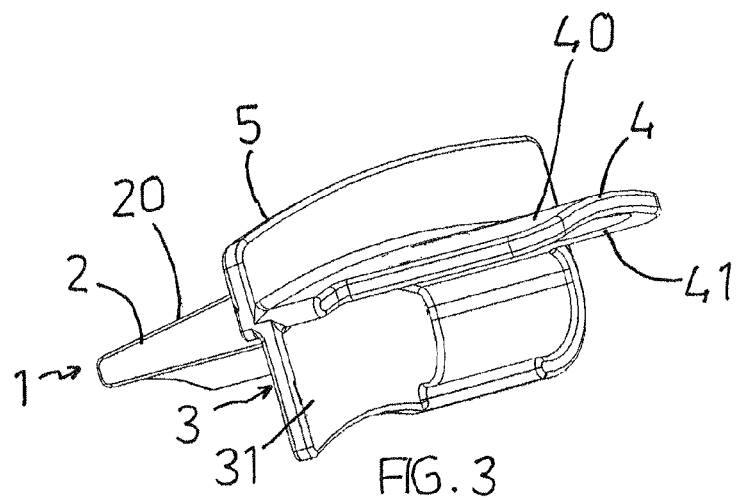
FIG. 3 is a rear side perspective view of the belt positioner shown in FIG. 1.

In the figures, like reference numerals refer to like features.

Referring first to FIGS. 1 to 11, there is shown a belt positioner 1 for installing an endless flexible belt 10 (such as a 'serpentine belt' or 'stretch fit' belt for a vehicle) into and around a grooved periphery 12 of a pulley 11. The positioner 1 generally comprises a belt guiding ramp 2, a pulley flange engaging mechanism 3, a handle 4 and a belt guiding rim 5. The positioner 1 is of unitary construction and is made of metal.

Figure 8:
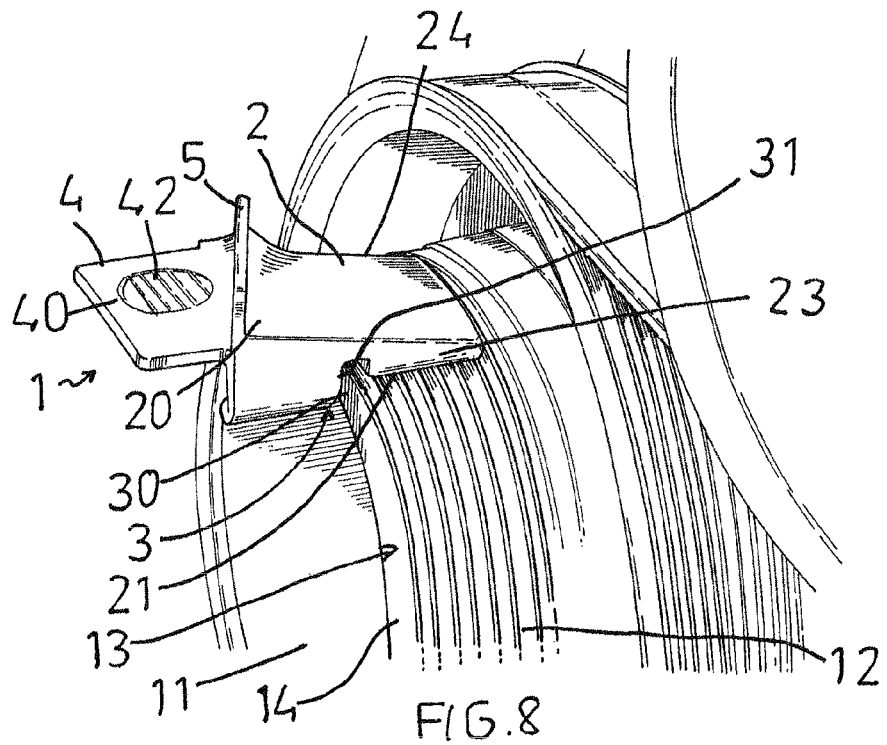
FIG. 8 shows how the belt positioner of FIG. 1 is positioned when installing a flexible belt into a grooved periphery of a pulley.

The ramp 2 has an upper slanting surface 20, a lower pulley groove bearing surface 21 and side walls extending between the slanting 20 and pulley groove bearing 21 surfaces. The upper slanting surface 20 and lower pulley groove bearing surface 21 are arcuate because the grooved periphery 12 of the pulley 11 is arcuate. As seen in FIG. 8, the slanting surface 20 of the ramp 2 extends across the pulley groove 12 and further laterally thereof. The slanting surface 20 of the ramp 2 extends at an angle of between about 8-16 degrees relative to the pulley groove bearing surface 21.

The ramp 2 has a leading edge 23 and a trailing edge 24, the leading edge 23 being the edge that leads when the pulley 11 is rotated about its rotational axis during belt installation.

The handle 4 is in the form of a sheet having upper 40 and lower faces 41 and providing at least one finger grip 42 on each face 40, 41 so that the handle 4 can be pinched by the user. As seen in FIG. 5 the sheet is arcuate when viewed on end because the grooved periphery 12 of the pulley 11 is arcuate.

The pulley flange engaging mechanism 3 comprises a groove 30 for receiving a pulley flange 13 bordering the grooved periphery 12 and a shoulder 31. The groove 30 extends within the lower pulley groove bearing surface 21 and the shoulder 31 borders the groove 30 for bearing against a side face 14 of the pulley flange 13. Part of the ramp 2 side wall 26 at the leading edge 23 is rolled over back towards the trailing edge 24 and adjoins the shoulder 31.

The belt guiding rim 5 extends from the slanting surface 20 of the ramp 2 and across the ramp 2 from the leading edge 23 to the trailing edge 24. As seen in FIG. 7, the belt guiding rim 5 is angled such that at the trailing edge 24 it is closer to the pulley flange engaging mechanism groove 30 than at the leading edge 23.

FIG. 8 shows how the belt positioner 1 is positioned and locked in that position when installing a flexible belt 10 into a grooved periphery 12 of a pulley 11. The handle 4 extends laterally of the grooved periphery 12 and substantially parallel with a rotational axis of the pulley 11.

Figure 9:
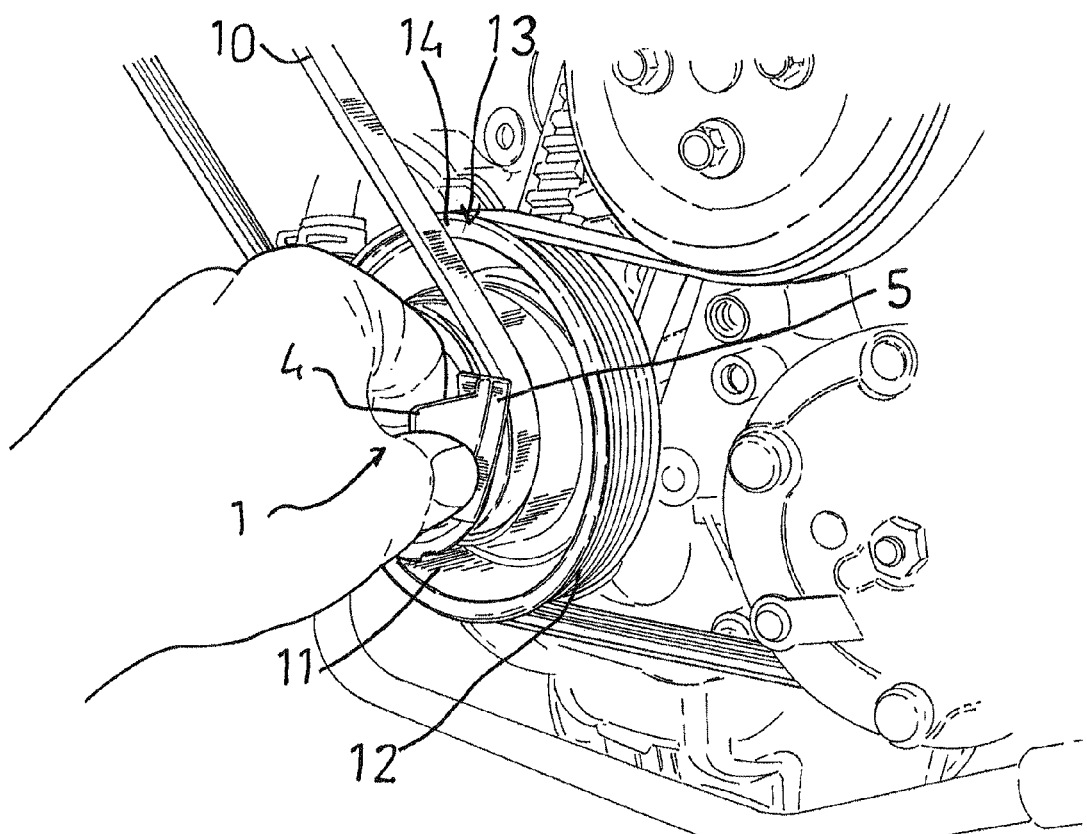
FIGS. 9 to 11 show steps for installing a flexible belt into a grooved periphery of a pulley using the belt positioner of FIG. 1.
Figure 10:
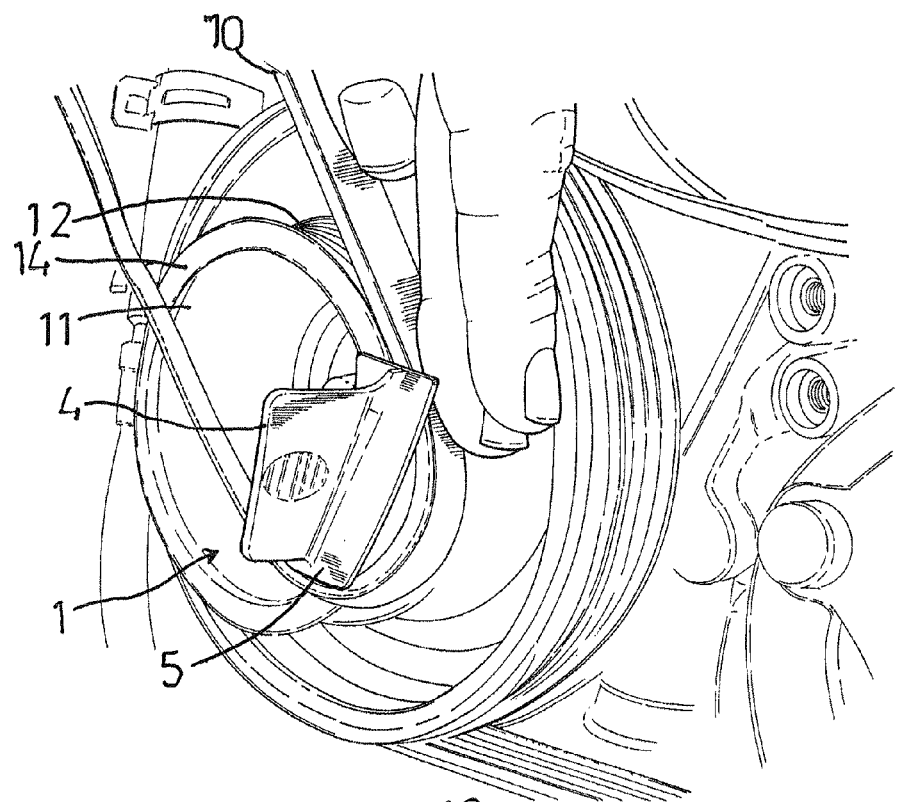
Figure 11:
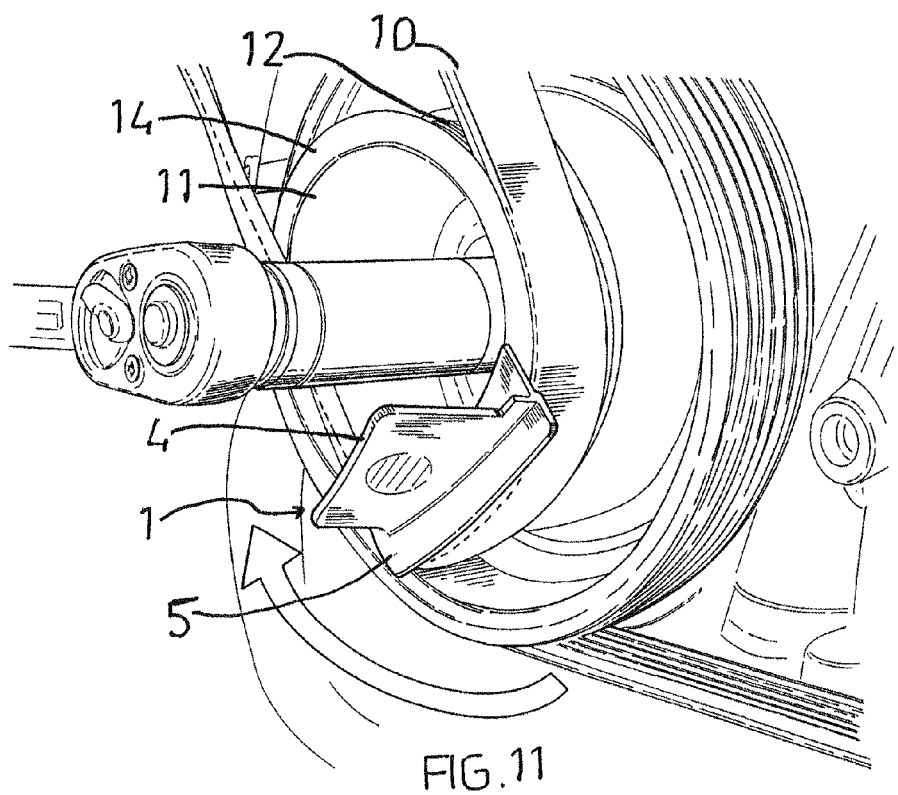

FIGS. 9 to 11 show steps for installing a flexible belt 10 into and around a grooved periphery 12 of a pulley 11. As seen in FIG. 9, a belt 10 is extended over the slanting surface 20 of the ramp 2 and the positioner 1 is moved into engagement with the pulley 11. Once engaged, the pulley 11 is rotated about its rotational axis first by hand as shown in FIG. 10 and then using a wrench as shown in FIG. 11 (in the direction of the arrow) once it is no longer possible to do so by hand. Whilst rotating the pulley 11, the belt guiding rim 5 and ramp 2 work together to install the belt 10 into the grooved periphery 12. That is, the belt guiding rim 5 bears against a side of the belt 10 and the belt 10 slides down the ramp 2. During rotation, the positioner 1 becomes trapped between the belt 10 and the pulley 11, and the pulley flange engaging mechanism 3 ensures that the positioner 1 is locked/held in place. That is, the groove 30 receives the pulley flange 13 and the shoulder 31 bears against the side face 14 of the pulley flange 13. After having rotated the pulley 11 through an angle of about 180°, the belt 10 is fully installed and the positioner 1 is released from between the belt 10 and the grooved periphery 12.

Referring now to FIGS. 12 to 21, there is shown a belt positioner 100 for removing an endless flexible belt 104 from within and around a grooved periphery 103 of a pulley 102. The positioner 100 generally comprises a belt guiding ramp 120, a pulley flange engaging mechanism 130 and a handle 140. The positioner 100 is of unitary construction and is made of metal.

Figure 13:
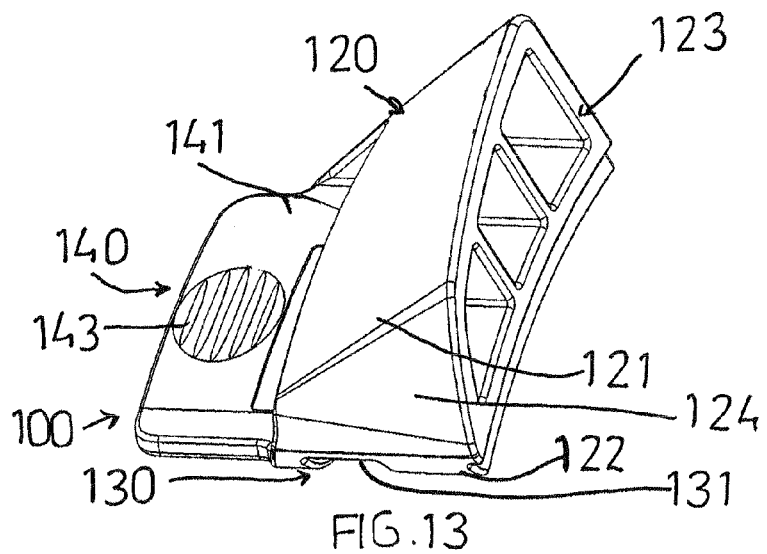
FIG. 13 is another top side perspective view of the belt positioner shown in FIG. 12.
Figure 14:
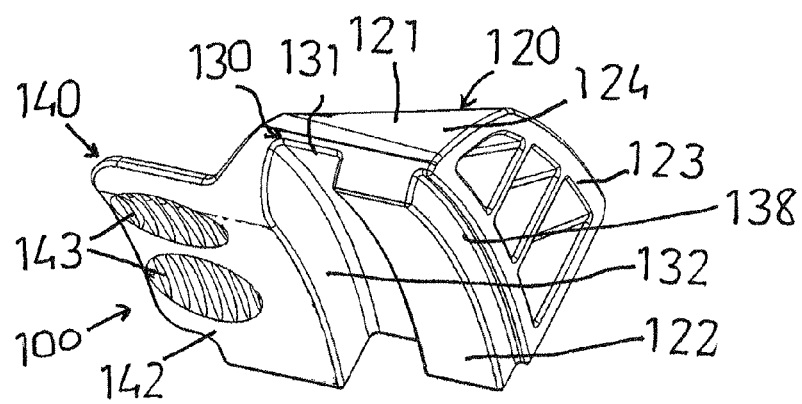
FIG. 14 is a bottom rear perspective view of the belt positioner shown in FIG. 12.

The ramp 120 has an upper slanting surface 121, a lower pulley groove bearing surface 122 and side walls extending between the slanting 121 and pulley groove bearing surfaces 122 (a rear side wall 123 is webbed, as shown in FIG. 13). The upper slanting surface 122 and lower pulley groove bearing surface 123 are arcuate because the grooved periphery 103 of the pulley 102 is arcuate. The slanting surface 121 of the ramp 120 extends at an angle of between about 20-30 degrees relative to the pulley groove bearing surface 122.

The ramp 120 has a leading edge 124 and a trailing edge 125, the leading edge 124 being the edge that leads when the pulley 102 is rotated about its rotational axis during belt 104 installation. To facilitate removal of a belt 104, the leading edge 124 of the ramp 120 is more rounded or tapered than the trailing edge 125.

Figure 12:
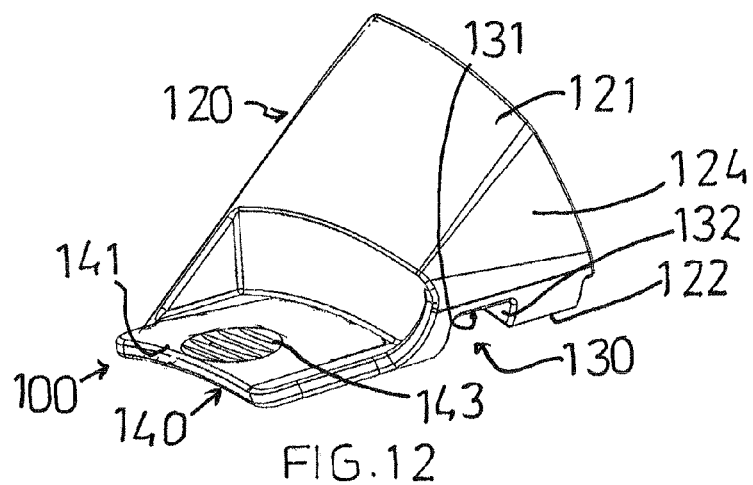
FIG. 12 is a top side perspective view of a belt positioner for removing a flexible belt such as a 'serpentine belt' or 'stretch fit' belt from within a grooved periphery of a pulley, according to an embodiment of the present invention.

The handle 140 is in the form of a sheet having upper 141 and lower 142 faces and providing at least one finger grip 143 on each face 141, 142 so that the handle 140 can be pinched by the user. As seen in FIG. 12 the sheet is arcuate when viewed on end because the grooved periphery 103 of the pulley 102 is arcuate.

The pulley flange engaging mechanism 130 comprises a groove 131 for receiving a pulley flange 135 bordering the grooved periphery 103 and a shoulder 132. The groove 131 extends within the lower pulley groove bearing surface 122 and the shoulder 132 borders the groove 131 for bearing against a side face 136 of the pulley flange 135.

Figure 19:
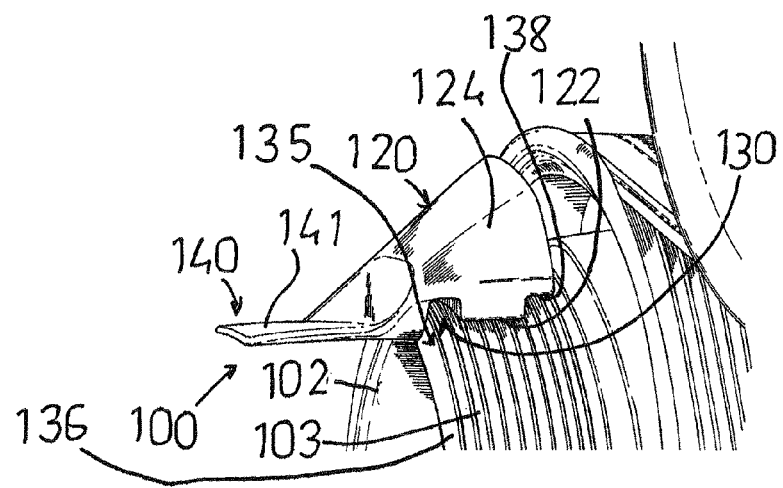
FIG. 19 shows how the belt positioner of FIG. 12 is positioned when removing a flexible belt from within a grooved periphery of a pulley.

A second groove 138 similar to groove 131 extends within the lower pulley groove bearing surface 122 and provides clearance for another pulley flange bordering the grooved periphery 103, as seen in FIG. 19.

FIG. 19 shows how the belt positioner 100 is positioned in a locking position when removing a flexible belt 104 from within a grooved periphery 103 of a pulley 102. The handle 140 extends laterally of the grooved periphery 103 and substantially parallel with the rotational axis of the pulley 102.

Figure 20:
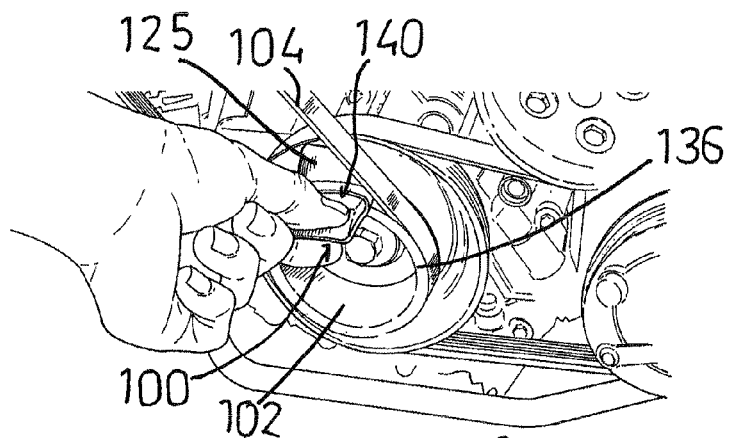
FIGS. 20 and 21 show steps for removing a flexible belt from within a grooved periphery of a pulley using the belt positioner of FIG. 12.
Figure 21:
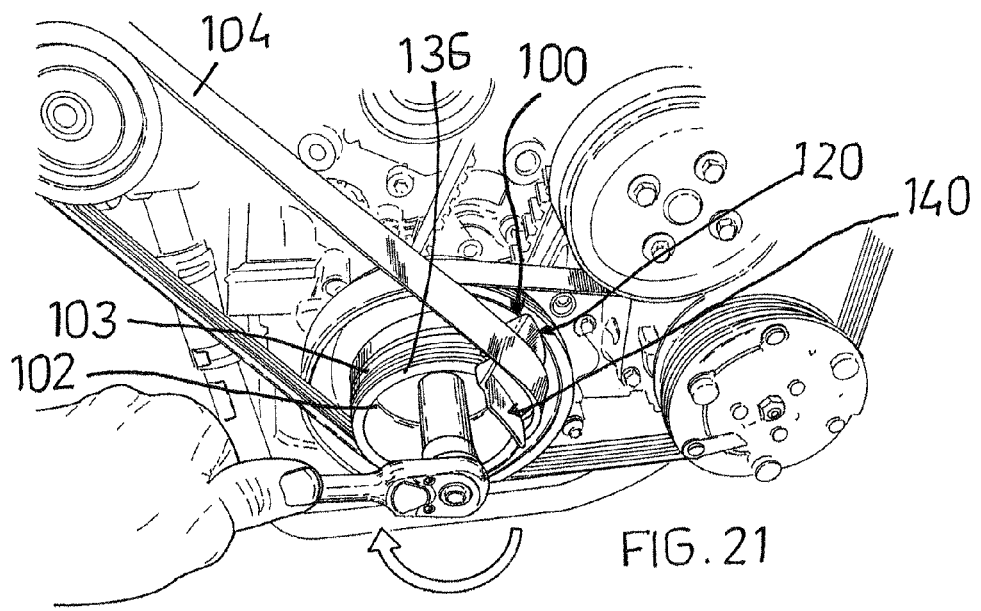

FIGS. 20 and 21 show steps for removing a flexible belt 104 from within and around a grooved periphery 103 of a pulley 102. As seen in FIG. 20, the leading edge 124 of the ramp 120 of the positioner 100 is wedged between the belt 104 and the grooved periphery 103 so that the positioner 100 becomes trapped between the belt 104 and the pulley 103, and the pulley flange engaging mechanism 130 ensures that the positioner 100 is locked/held in place. That is, the groove 131 receives the pulley flange 135 and the shoulder 132 bears against the side face 136 of the pulley flange 135.

Once engaged, the pulley 102 is rotated about its rotational axis first by hand and then using a wrench as shown in FIG. 21 (in the direction of the arrow) once it is no longer possible to do so by hand. Whilst rotating the pulley 102, the ramp 120 raises the belt 104 from within the grooved periphery 103 and the belt 104 slides down the ramp 120. After having rotated the pulley 102 through an angle of about 120°, the belt 104 is fully removed and the positioner 100 is released from between the belt 104 and the grooved periphery 103.

Some of the advantages of each belt positioner 1, 100 as exemplified include:

a. it does not require specific pre-mounting to the pulley in order to operate, eg. the mounting of a positioning jig to a shaft of the pulley;

b. it can be used in confined spaces, due to its small size and the way that it operates;

c. if used correctly, it is unlikely to damage the pulley nor the belt, and the belt need not be cut off and discarded; and d. it is cost-effective to manufacture as it consists of a single piece.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to publications cited in this specification is not an admission that the disclosures constitute common general knowledge in Australia nor elsewhere.

The invention claimed is:

1. A belt positioner for either installing or removing a flexible belt relative to a grooved periphery of a pulley having a pulley shaft defining a rotational axis of the pulley, wherein the belt positioner comprises:

a belt guiding ramp extendible across the grooved periphery of the pulley, the belt guiding ramp including a belt-bearing slanting surface which enables the belt to be moved either into or out of engagement with the grooved periphery when the pulley is rotated about the rotational axis thereof;

a handle extending laterally relative to the grooved periphery of the pulley generally in a direction of the rotational axis thereof to provide a gripping surface immediately adjacent the ramp, wherein the handle facilitates the installation or removal of the ramp relative to the grooved periphery of the pulley until the belt bears against the slanting surface of the ramp; and a pulley flange engaging mechanism comprising a groove extending across the positioner for receiving a pulley flange bordering the grooved periphery, and a shoulder bordering the groove for bearing against a side face of the pulley flange, wherein the shoulder is configured such that in use the shoulder extends along the side face of the pulley flange towards, but does not extend to, the rotational axis defined by the pulley shaft thereby allowing the pulley shaft to be engaged by a tool generally in a direction of the rotational axis thereof, and wherein the pulley flange engaging mechanism allows the belt positioner to be moved from one position to another relative to the pulley flange when the belt is disengaged from the slanting surface of the ramp, but positionally locks the belt positioner to the pulley flange when the belt bears against the slanting surface of the ramp.

2. The belt positioner of claim 1, wherein the handle has opposed faces and each of said faces provides a gripping surface.

3. The belt positioner of claim 1, wherein the ramp comprises a pulley groove bearing surface spaced from the slanting surface, and wherein each of the pulley groove bearing surface and the slanting surface is arcuate.

4. The belt positioner of claim 3, wherein the groove of the pulley flange engaging mechanism is arcuate and extends within the pulley groove bearing surface of the ramp.

5. The belt positioner of claim 4, wherein the ramp comprises a leading edge and a trailing edge, wherein the leading edge leads the trailing edge when the pulley is rotated about the rotational axis thereof during belt installation or removal.

6. The belt positioner of claim 5, wherein the leading edge of the ramp is rounded or tapered for belt removal so as to more readily facilitate lifting of the belt from the grooved periphery of the pulley.

7. The belt positioner of claim 6, wherein the positioner for belt installation further comprises a belt guiding rim extending from the slanting surface of the ramp generally across the ramp for engaging a side of the belt and thereby helping to guide the belt down the slanting surface into the grooved periphery of the pulley as the pulley is rotated.

8. The belt positioner of claim 7, wherein the belt guiding rim is angled such that the trailing edge thereof is closer to the pulley flange engaging mechanism groove than at the leading edge thereof.

9. The belt positioner of claim 3, wherein the slanting surface is at a greater incline relative to the pulley groove bearing surface for the belt positioner when used for belt removal than when used for belt installation.

10. The belt positioner of claim 1, wherein the slanting surface of the ramp for belt installation extends across the grooved periphery of the pulley and further laterally thereof.

11. The belt positioner of claim 1, wherein the belt guiding ramp, handle and pulley flange engaging mechanism are of unitary construction.

* * * * *